March 2, 1965 R. W. STEVENS ETAL 3,171,993
SEALED SALIENT FIELD POLE
Filed Oct. 11, 1960
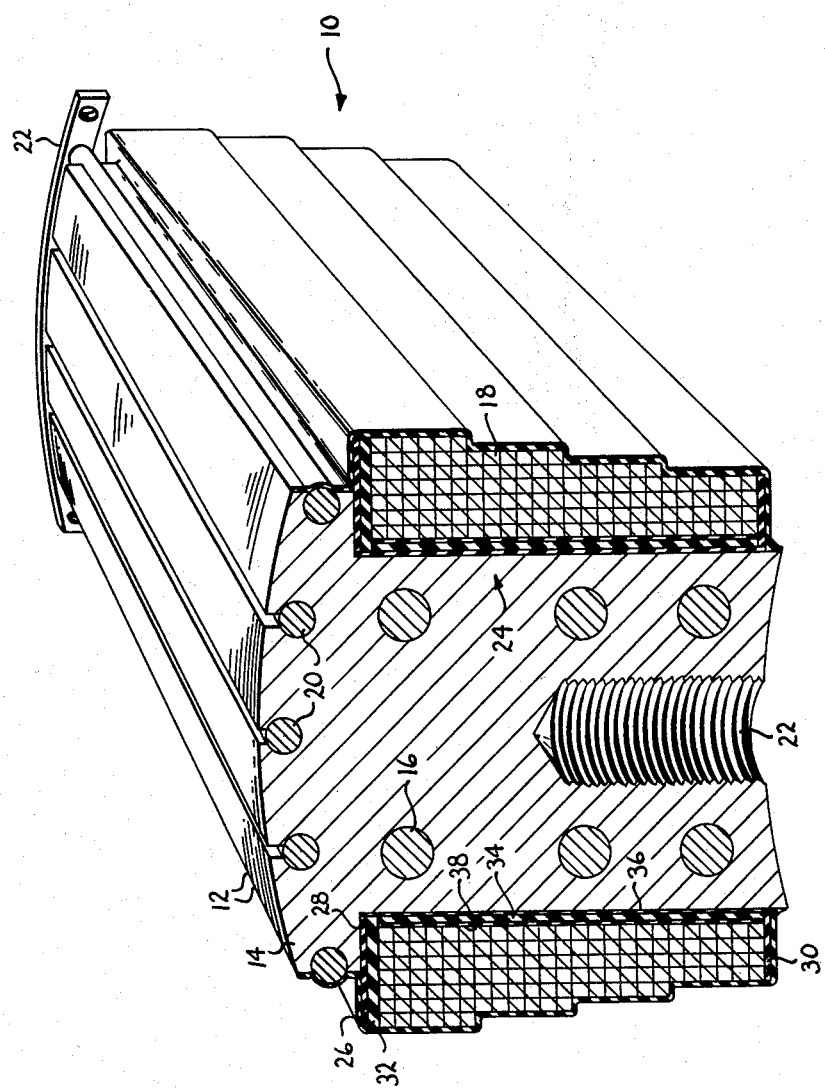
INVENTORS
JULES S. DAVID
BY ROBERT W. STEVENS
*James R Campbell*
THEIR ATTORNEY 3,171,993
SEALED SALIENT FIELD POLE
Robert W. Stevens and Jules S. David, Schenectady, N.Y., assignors to General Electric Company, a corporation of New York
Filed Oct. 11, 1960, Ser. No. 61,882
2 Claims. (Cl. 310—45)

The invention described herein relates to dynamoelectric machines and more particularly to an improved salient pole used in synchronous motors and generators.

Conventional salient poles utilize insulation of diverse kinds for spacing a coil or winding from the pole body. Paper or mica, for example, constitute two widely used insulating mediums, but these and other insulations are subject to certain drawbacks which must be eliminated to secure improved salient pole performance. The primary disadvantage is that extensive current creepage paths become established in the insulation between the coil and iron of the pole body which is at ground potential. Development of such paths are attributable in part, to the fact that the coil and insulation are not sealed directly to the pole body. The looseness which thus exists, permits moisture and foreign particles to enter the various openings and become lodged in and between the layers of insulation. As time progresses and the salient pole is subjected to the varying influences of thermal cycling and mechanical and electrical vibratory forces, in addition to the varying atmospheric conditions, the insulation becomes spaced from the pole body and also delaminates thus providing a base for the establishment of paths in the insulation over which current flows from the energized coil to ground.

The fact that the paper is hygroscopic, as is common in most insulations used in salient field pole structures, is important because it contributes substantially to establishment of the creepage paths, particularly where delamination concurrently is taking place.

Another disadvantage of known constructions is that air pockets develop in the insulation so that the ability to transfer heat between the coil and pole iron is reduced to a great extent. Although the insulation shrinks with age, which is conducive to elimination of air pockets, it also dries out and allows microscopic air bubbles to form. Shrinkage likewise effects a shortening of the current creepage distances. In conventional field pole designs, thick collars are used for minimizing establishment of current creepage paths to ground. The collars serve an ancillary function of absorbing centrifugal forces imposed thereon by the field coil and insulation during machine operation. A major disadvantage inherent in the use of the collars is that the required collar thickness limits the amount of wire which can be wound in the available winding space.

It is therefore evident that the lack of effective sealing between the insulation and pole body is such that a compact structure free of current creepage paths cannot be provided. Since a tight bond therebetween is not made, it is not possible to contain easily the centrifugal forces imposed on the coil and insulation by transferring such forces to the pole body rather than to the pole tip.

Prior insulation systems also employ woven glass fabrics or glass mats impregnated with a resinous composition as the primary insulation between the coil and pole body surfaces. It has been found however that most resinous products will not permanently adhere in the window or exposed surfaces in the grid-like structure of the glass fabric or mats when the coil is repeatedly heat cycled over a relatively long period of time. When the resin separates from the multiplicity of small window-like openings and leaves void spaces, the dielectric strength diminishes and current creepage paths are formed to ground. Such materials therefore cannot be relied on completely for providing the necessary degree of dielectric strength for the insulated coil.

The above types of insulation systems, except for relatively minor variations, have not changed substantially over the past 20–30 years. Machines incorporating these systems operate extremely well in service but recent developments made in insulation materials and systems for coils used in the armature, now provide a degree of dielectric protection thereto greater than that presently obtainable in the salient field poles. Therefore, the need is great for an improved salient field pole having insulation characteristics compatible with the armature insulation system.

The primary object of our invention therefore is to provide a field pole construction in which the insulation and coil for each salient field pole are firmly bonded to each other and to the field pole body for precluding the establishment of current creepage paths between the coil and field pole body.

Another object of our invention is to provide a sealed field coil capable of more effectively utilizing the available space on the pole body for the coil and of transferring heat to the iron core than those field pole constructions of the prior art.

In carrying out our invention, we provide a salient field pole having a winding insulated from but bonded to the iron of a pole body by a layer of glass-asbestos insulation impregnated with a thermosetting resinous composition. When the resin cures and bonds to a similar resin previously applied to the pole body, a tight bond is furnished between the insulation and the pole body such that it precludes the infiltration of moisture and foreign particles between the insulation and the pole body of the field pole. Since the coil is applied to the surface of the insulation by a winding process, insulating mediums of high cut-through resistance are positioned on the corners of the coil to prevent damage to the relatively soft and uncured insulation positioned therebeneath. Hoods of a similar asbestos-glass insulated material are located on the outer and inner ends of each field coil which serve effectively to increase the current creepage path to ground, although the thickness of these hoods and the collar are substantially less than that used in the prior art. During the winding of the coil on the pole body, a resinous composition is caused to flow freely onto the layers of insulation being wound thereon so that when the resin is cured, a firm bond between adjacent layers and turns of wire in the coil takes place. In order to provide a smooth passage surface on the coil for preventing adherence of foreign particles thereto, an additional resinous composition is formed thereon as a final step in the manufacture of the coil.

While the specification concludes with claims particularly pointing out and distinctly claiming the subject matter which we regard as our invention, it is believed the invention will be better understod from the following description taken in connection with the accompanying drawing in which:

The single figure is a cross-section view in elevation illustrating the various insulation components in the field pole of this inventon.

Referring now to the drawing wherein like reference characters designate like or corresponding parts, there is shown a salient field pole 10 comprising a plurality of laminations 12 assembled together to form a body for the field pole. Each lamination includes outwardly extending portions 14 which serve as a pole tip when the laminations are all assembled to form the pole body. Axially extending bars 16 are positioned in the field pole body for providing a tightly bound, compact pole piece designed for receiving a coil 18. An amortisseur winding 20 including end rings 22 are positioned in the outer surface of the pole body for facilitating starting of the machine on which field poles of this type are adapted for mounting. A series of threaded openings 22 are formed on the inner side of each pole for permitting the attachment to the spider of a synchronous machine.

The insulation 24 disposed between the field coil and pole body is chosen to be of an initially soft easily formed material to permit conformance to the outline of a pole body. A resin incorporated in the insulation facilitates establishing a firm bond between the insulation and a similar resinous composition previously applied to the pole body. The characteristics of high tensile and dielectric strength are important in this kind of insulation. Such a material consists of a commercially available glass-asbestos product.

This glass-asbestos material is formed by obtaining a pair of sheets respectively of fibrous asbestos and woven glass cloth which are drawn simultaneously through a bath of an epoxy, polyester or other thermosetting type of resin capable of completely impregnating the sheets of material. Upon being drawn from the bath, the sheets are passed through a roller which compresses the two layers firmly together such that the fibrous particles of asbestos are forced into the interstitial openings in the glass cloth so that the two products then assume the appearance of a single sheet of insulation material. Because of its construction, the material will not delaminate and the bond between the two products is so great that they are inextricably bonded together, thus making delamination impossible. The resulting product has the above-identified properties in addition to others which makes it extremely desirable for use as an insulating medium, and particularly when used in the circumstances of this invention.

In the constructions of the prior art, collars in the neighborhood of 3/16" thick were located on opposite ends of the field coil for providing a long creepage path between the coil and ground. By the use of this asbestos-glass type of material, the thickness of collars can now be reduced a very substantial amount from 3/16" to 1/16" while simultaneously increasing the dielectric strength between the coil and the iron of the pole body.

In carrying out the process of insulating the coil, a piece of asbestos-glass insulation is slit in the form of a pair of inverted Y's joined by their legs and the material then folded outwardly and the hood 26 placed on the field pole and in intimate contact with the pole tip 28. Since the material is slit, it is evident that the tabs thus formed extend along the sides of the pole while those parts not cut lie flush against the pole tip. A similar piece of asbestos-glass insulation 30 is likewise disposed on the opposite or rotor spider end of the pole body. Since a corner of each hood will fit over a corresponding corner on the field pole, to eliminate a possible current leakage path to ground, a triangular strip or patch of material, not shown, is merely placed behind and at each corner of the material. These patches serve to close gaps formed at these points by the joints in the top and bottom pole hoods and the pole body insulation. The hood at the rotor spider end of the pole forms a structure collar as well as a dielectric and creepage barrier integral with the winding thus making unnecesary the thick insulating collar usually placed at this point. This washer or collar 32 of glass mat re-enforced polyester is located at the pole tip to provide an insulating and centrifugal stress distributing member and to aid in the location of the winding with respect to the pole tip. As discussed hereafter, this arrangement of hoods and collar imparts improved dielectric strength to the insulation system at the inner and outer ends of the pole body, thus permitting the hoods and collar to be made of material of thinner cross section than that previously used in the art. In a specific installation, the material has been reduced in thicknesses from 3/16" to 1/16".

As previously indicated, it is extremely important to have a firm bond between the ground insulation 34 and the pole body for preventing moisture or liquid from reaching the winding from the direction of the pole surfaces. This is accomplished by initially coating the pole body surfaces with an epoxy or other thermosetting resinous material 36 which is compatible with the resin in the asbestos-glass insulation 34. The asbestos-glass insulation is then wrapped on the pole body to a thickness corresponding to the voltage at which the field pole will operate. Because the saturant in the insulation is in an uncured condition to allow formability to the pole and to bond and laminate to itself to provide sealing, the material has relatively low compressive strength in this state. Therefore, as the conductor is wound under tension over this material on the corners of the pole, very high compressive forces result which cause cut-through of the glass and flow of the asbestos layer away from the corner. This condition may cause dielectric failure of the winding to ground when voltage is applied. To reduce the severity of this cut-through action the corners are provided with a reinforcing strip which distributes and resists these corner forces. This material must possess high compressive stress and be able to be formed at a 90° angle without loss of dielectric properties. A fully polymerized asbestos-glass laminate 38, impregnated with a flexible polyester resin satisfactorily performs this function. Other materials found suitable are polyester film materials, such as Mylar, or woven Dacron or epoxy treated polyester film laminate, such as Dacron.

With this ground insulation in place, the coil is wrapped around it in the usual manner. The first turn of wire near the collar 32 may be wrapped with an insulating medium for increasing the dielectric strength. In order to provide a firm bond between adjacent layers and turns of wire in each layer, an epoxy resin is poured on the layers as the coil is being wound. Upon completion of this step, in the process, the complete insulated field pole is then subjected to a temperature and for a period of time at which the resinous products in the coil and insulation will cure thus providing a firm bond between the insulation and the pole body and between the coil and the insulation but also between the turns in the layers of the coil itself. The field pole may then be capped with an additional layer of insulation to provide a glassy surface resistant to the deposition of foreign particles thereon. This may consist of a thermosetting resinous material which is applied by brushing or by fluid bed processing. It is evident that this capping medium may be applied before the field pole insulation is cured so that it may be performed in one operation.

In view of the above, it is evident that many modifications and variations are possible in light of the above teachings. Therefore it is to be understood that within the scope of the appended claims the invention may be practiced other than as specifically described.

What we claim as new and desire to secure by Letters Patent of the United States is:

1. A sealed field pole comprising a magnetic core having a winding thereon, insulation spacing said winding from the iron of the magnetic core, said insulation comprising a layer of asbestos-glass cloth impregnated with a thermosetting resinous material wound on the face of said magnetic core and being firmly bonded thereto, said layer of asbestos-glass cloth comprising a pair of overlapping sheets of said cloth and a patch of material having the same composition as the asbestos-glass cloth placed in overlapping relationship with the sheets of cloth placed therebeneath, hoods of asbestos-glass insulation positioned on the opposite ends of said winding for spacing the ends thereof from the iron of magnetic core, and a coating of thermosetting resinous material applied to the outer surfaces of said winding for providing a glass-like surface resistant to the deposition of foreign particles when the field pole is in operation.

2. A sealed field pole comprising a magnetic core having a winding thereon, insulation spacing said winding from the iron of the magnetic core, said insulation comprising a coating of thermosetting resinous material on the surface of the core, a layer of asbestos-glass cloth impregnated with thermosetting resinous material firmly bonded to the core, means disposed on the inner and outer ends of the winding for establishing a dielectric barrier between the ends of the winding and the iron of the core which is at ground potential, protectors positioned on the corners of the field pole between the insulation and the winding for preventing damage to the insulation during the process of placing the winding on the core, and a coating of thermosetting resinous material applied to the outer surface of the field pole for presenting a glassy finish resistant to the deposition of foreign particles when the field pole is in operation.

References Cited by the Examiner

UNITED STATES PATENTS 2,473,842   6/49   Askey _____ 310—43
2,769,104   10/56  Hirsch _____ 310—269 X

OTHER REFERENCES

Allis-Chalmers Electrical Review (reprint), third quarter 1956, page 166.

MILTON O. HIRSHFIELD, *Primary Examiner.*